US009098380B2

(12) United States Patent
Firman et al.

(10) Patent No.: US 9,098,380 B2
(45) Date of Patent: *Aug. 4, 2015

(54) MULTIPLE APPLICATION VERSIONS (71) Applicant: Google, Mountain View, CA (US)

(72) Inventors: Ilya Firman, San Mateo, CA (US); Jasper S. Lin, Monterey Park, CA (US); Mark D. Womack, San Jose, CA (US); Yu-Kuan Lin, Taipei (TW); Sheng-chi Hsieh, Taipei County (TW); Juliana Tsang, San Lorenzo, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,439

(22) Filed: Feb. 21, 2014

(65) Prior Publication Data
US 2014/0173585 A1 Jun. 19, 2014

Related U.S. Application Data (63) Continuation of application No. 13/187,198, filed on Jul. 20, 2011, now Pat. No. 8,707,289.

(51) Int. Cl.
G06F 9/44 (2006.01)
G06F 9/445 (2006.01)

(52) U.S. Cl.
CPC ... G06F 8/71 (2013.01); G06F 8/60 (2013.01)

(58) Field of Classification Search
CPC ................ G06F 8/65; G06F 8/71; G06F 8/67
USPC .......................................................... 717/170
See application file for complete search history.

(56) References Cited

U.S. PATENT DOCUMENTS

| | | |
|---|---|---|
| 7,257,583 B2 | 8/2007 | Hofmeister et al. |
| 7,409,208 B1 | 8/2008 | Clare et al. |
| 7,844,658 B2 | 11/2010 | Woundy et al. |

(Continued)

FOREIGN PATENT DOCUMENTS

CN 101119517 2/2008

OTHER PUBLICATIONS

International Search Report & Written Opinion for Application No. PCT/US2012/047639, dated Nov. 5, 2012, 12 pages.

(Continued)

*Primary Examiner* — Anna Deng
(74) *Attorney, Agent, or Firm* — Fish & Richardson P.C.

(57) ABSTRACT

In one aspect, this application describes a method for determining a version of a software application targeted for a computing device. The method includes receiving, at an application marketplace system and from a user associated with a computing device that operates remotely from the application marketplace system, a request that corresponds to a software application distributed by the application marketplace system, the software application having multiple versions on the application marketplace system. The method also includes determining one or more device attributes that are associated with the computing device, and identifying a particular version of the software application, from among the multiple versions on the application marketplace system, that is targeted for the computing device based on the device attributes. The method also includes providing, for display to the user and in response to the request, information related to the particular version of the software application.

20 Claims, 6 Drawing Sheets

(56) References Cited

U.S. PATENT DOCUMENTS

| | | |
|---|---|---|
| 8,213,921 B2 | 7/2012 | Chen et al. |
| 8,255,924 B2 | 8/2012 | Wundy et al. |
| 2002/0040326 A1 | 4/2002 | Spratt |
| 2003/0221190 A1 | 11/2003 | Deshpande et al. |
| 2004/0002943 A1 | 1/2004 | Merrill et al. |
| 2004/0068721 A1 | 4/2004 | O'Neill et al. |
| 2004/0098715 A1 | 5/2004 | Aghera et al. |
| 2004/0203681 A1 | 10/2004 | Ross et al. |
| 2005/0108690 A1* | 5/2005 | Lau et al. .................... 717/136 |
| 2005/0154759 A1 | 7/2005 | Hofmeister et al. |
| 2005/0177829 A1 | 8/2005 | Vishwanath |
| 2005/0188371 A1* | 8/2005 | Bocking et al. ............... 717/178 |
| 2006/0143601 A1 | 6/2006 | Concha et al. |
| 2006/0217111 A1 | 9/2006 | Marolia et al. |
| 2007/0255576 A1 | 11/2007 | Patterson |
| 2008/0052383 A1 | 2/2008 | O'Shaughnessy et al. |
| 2008/0082657 A1* | 4/2008 | Hart et al. .................... 709/224 |
| 2008/0120611 A1 | 5/2008 | Aaron |
| 2008/0178175 A1 | 7/2008 | Woundy et al. |
| 2009/0037287 A1* | 2/2009 | Baitalmal et al. ............... 705/26 |
| 2010/0011354 A1 | 1/2010 | Gharabally et al. |
| 2010/0087181 A1* | 4/2010 | Chen et al. .................... 455/418 |
| 2010/0088696 A1* | 4/2010 | Stoev et al. .................... 717/178 |
| 2010/0205247 A1* | 8/2010 | DiMichele et al. ........... 709/203 |
| 2010/0205274 A1 | 8/2010 | Gharabally et al. |
| 2010/0325624 A1* | 12/2010 | Bartolo et al. ................ 717/176 |
| 2010/0332296 A1* | 12/2010 | Gharabally .................. 705/14.2 |
| 2011/0035457 A1 | 2/2011 | Woundy et al. |
| 2011/0161912 A1 | 6/2011 | Eteminan et al. |

OTHER PUBLICATIONS

Office Action issued in Chinese Application No. 201280045508.2 on Nov. 3, 2014, 22 pages (with English translation).

* cited by examiner

MULTIPLE APPLICATION VERSIONS

CROSS-REFERENCE TO RELATED APPLICATIONS

This application is a continuation application of and claims priority to U.S. application Ser. No. 13/187,198, filed on Jul. 20, 2011, the entire contents of which are hereby incorporated by reference.

TECHNICAL FIELD

This document generally relates to software distribution systems.

BACKGROUND

Software applications may be sold and distributed using a variety of models. One example of a model that is sometimes used to distribute applications, or apps, targeted to mobile devices and other computing devices is an application marketplace model. In this model, software developers may submit their applications to be published in an online application marketplace, and the marketplace may provide an interface that allows users to browse or search for the published applications.

When a user identifies an application that he or she wishes to obtain, the application marketplace may generally facilitate the transaction. For example, in the case of a free application, the application marketplace may simply provide the application for download to one or more of the user's devices. In the case of a paid application, the application marketplace may provide the application for download, and may also provide services related to collecting payment from the user and compensating the software developer. Application marketplaces may typically be operated by organizations that are trusted by both the software developers and the users to handle any such application transactions appropriately.

SUMMARY

This document describes systems and techniques that allow software developers or publishers to provide multiple versions of a particular application in a software distribution system, such as an application marketplace. Different versions of an application may be targeted for distribution to different devices or device types based on the capabilities of the particular device requesting the application or other attributes associated with the device. For example, a standard version of an application may be targeted to basic smartphones with standard capabilities, and a large-screen version of the same application may be targeted to tablets or to smartphones with screens above a certain size. As another example, a basic version of an application may be targeted to a device with a particular operating system, while an advanced version of the application that takes advantage of some features of a newer operating system may be targeted to devices that have the newer operating system installed.

Rather than presenting all of the multiple versions of the application to a user browsing the application marketplace, which may confuse the user, the application marketplace may instead determine which of the multiple versions most appropriately matches the user's device, and only present that particular version to the user. As such, a software developer may publish multiple different versions of an application on an application marketplace without worrying about users accidently choosing a version that is incompatible with or non-optimized for the users' respective devices. In addition, the application marketplace may be able to monitor various application metrics, such as user rankings and installation statistics, across the different versions of the application.

In one aspect, this application describes a computer-implemented method for determining a version of a software application targeted for a computing device. The method includes receiving, at an application marketplace system and from a user associated with a computing device that operates remotely from the application marketplace system, a request that corresponds to a software application distributed by the application marketplace system, the software application having multiple versions on the application marketplace system. The method also includes determining one or more device attributes that are associated with the computing device, and identifying a particular version of the software application, from among the multiple versions on the application marketplace system, that is targeted for the computing device based on the device attributes. The method also includes providing, for display to the user and in response to the request, information related to the particular version of the software application.

In another aspect, this application describes a computer-implemented method for distributing software through an application marketplace. The method includes receiving, at a computer system and from an application developer, a plurality of versions of a software program. The method also includes associating, with the computer system, particular ones of the versions of the software program with particular computing devices, device classes, or device capabilities. The method also includes receiving, at the computer system and from a prospective user of the software program, a request for the software program along with information that defines capabilities of a device of the user. The method also includes selecting, from among the plurality of versions of the software program, a particular version that matches the defined capabilities of the device of the user, and delivering the selected version of the software program over an electronic network to the device of the user.

In another aspect, this application describes a computer-implemented system for distributing software through an application marketplace. The system includes an application publisher computing system that receives a plurality of versions of a software program from an application publisher, and that associates particular ones of the versions of the software program with particular computing devices, device classes, or device capabilities. The system also includes an application marketplace computing system that receives, from a prospective user of the software program, a request for the software program along with information that defines capabilities of a device of the user. The application marketplace computing system also selects, from among the plurality of versions of the software program, a version that matches the defined capabilities of the device of the user, and delivers the selected version of the software program over an electronic network to the device of the user.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques that allow software developers and/or publishers to publish multiple versions of an application in an application marketplace. Such functionality may be used by software developers and/or publishers in a number of different situations. For example, a software developer may want its application to support devices having different screen sizes (e.g., smartphones and tablets), and may wish to provide graphics and other user interface elements that are specifically tailored to the particular device that will be executing the application. In such an example, the software developer may develop two or more versions of the application, and may publish the two or more versions in an application marketplace for distribution to the appropriate devices. Similarly, another software developer may wish to support devices with different operating frameworks (e.g., operating systems or application programming interfaces (APIs)), and may want to provide features that are specific to the particular framework of the device. Once again, the software developer may choose to publish different versions of the application, and may rely on the application marketplace to distribute the appropriate version to the particular device for which the application is requested.

In accordance with the techniques described here, the application marketplace may identify the appropriate version of the application for a device by determining certain attributes associated with the device. Continuing with the examples above, the application marketplace may receive a request from a smartphone with a small screen size, and based on the smartphone's screen size may provide a small-screen version of the application for download by the smartphone. In response to receiving a similar request, but from a tablet with an extra-large screen size, the application marketplace may instead provide a large-screen version of the application for download by the tablet.

In some implementations, such functionality may be transparent to the user in that the user need not be aware of the different versions of the application. Instead, in such implementations, the application marketplace may only show the user the version of the application that is targeted to the user's particular device. In this manner, the application marketplace may prevent user confusion that may otherwise occur if the user is presented with multiple different choices for download.

Figure 1A:
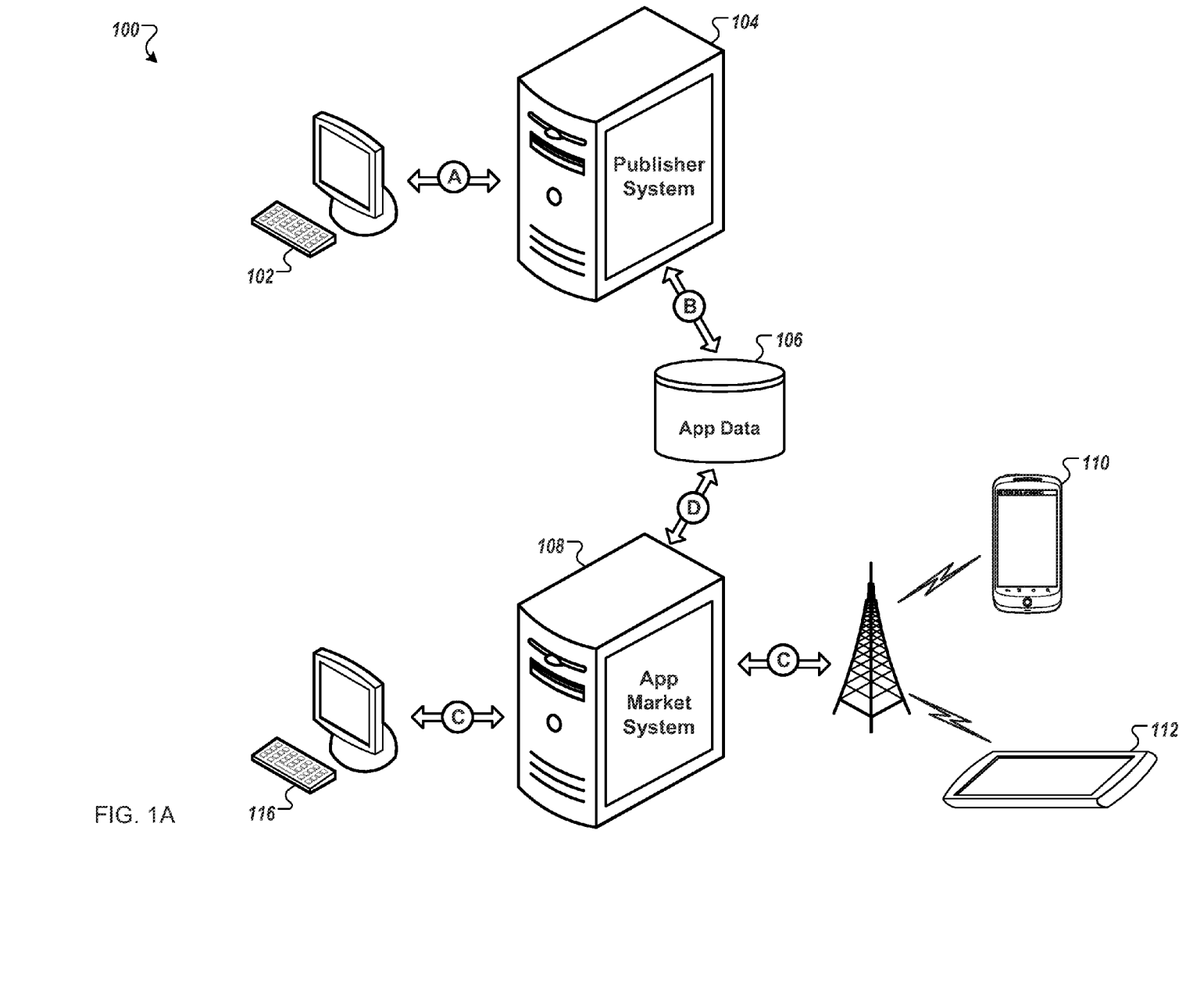
FIG. 1A is a conceptual diagram showing an example of an environment for publishing and distributing software applications.

FIG. 1A is a conceptual diagram showing an example of an environment 100 for publishing and distributing software applications. In the environment 100, a software publisher using a computing device 102 may interact with a publisher system 104 to upload and/or publish multiple versions of an application, as shown by the arrow labeled A. The software publisher may also use publisher system 104 to define particular devices, device types, or device groups to which particular versions of the application are to be targeted. For example, the software publisher may specify that one version of an application should be provided to mobile computing devices that have a camera, while another version of the same application should be provided to mobile computing devices without a camera (e.g., a less complicated version that does not include picture-taking capabilities).

The publisher system 104 may allow software publishers to specify version targeting in a number of ways. For example, in some implementations, the software publisher may include metadata information in the application binaries that correspond to the respective application versions, e.g., in a manifest file that is embedded in the binary. The manifest file may describe certain dependencies, restrictions, or other types of information that relate to the devices or device types that are capable of executing the application. Information in the manifest file may be used by the application publisher system 104 to automatically (e.g., without user intervention) define a set of one or more application properties that may be used to target the version to a particular device or group of devices. For example, if the manifest declares that the application version is only compatible with operating system (OS) 2.0 or above, then the application publisher system 104 may automatically target the application version to devices that have an OS of 2.0 or above. Another version of the application may include a manifest that declares compatibility with OS 1.6 through 1.8, and the application publisher system 104 may therefore target the application version to devices having an OS of 1.6 through 1.8.

In other implementations, the application publisher system 104 may provide a user interface that allows the software publisher to define device groups using various device attributes. The device groups may each correspond to a different version of the software application. For example, the software publisher may choose one or more device attributes on which to distinguish the various device groups, and may provide values or ranges of values for each of the device attributes to define the device groups. The software publisher may define any appropriate number of device groups, each of which may be associated with one particular version of the application, to control the distribution of the respective application versions to appropriate devices for which the application version is targeted. By defining the device groups using multiple different device attribute combinations, the software publisher may be able to specify distribution of its application versions using any appropriate level of granularity.

The application publisher system 104 may also use a combination of these approaches to define device groups for targeting application versions to particular device groups. For example, the publisher system 104 may initially set up the device groups automatically using information from the manifest included with the application binaries, and may then allow the software publisher to adjust or tweak the device groups as appropriate.

Communication between computing device 102 and publisher system 104 may occur over any appropriate network (e.g., Internet, LAN, WAN, wireless broadband, or any combination thereof). Computing device 102 is depicted as a desktop computer, but other types of computing devices (e.g., laptop computers, netbooks, tablets, smartphones, set-top boxes, and the like) may also communicate with publisher system 104. Similarly, publisher system 104 is depicted as a stand-alone server, but publisher system 104 may represent a cluster of servers, a server farm, or other groupings of servers that can be used to host the functionality of publisher system 104. In some implementations, publisher system 104 may be operated by a trusted organization that provides the publishing services described here.

Upon receiving instructions from the software developer to publish the application, including one or more versions of the application, publisher system 104 may write certain information about the application to one or more data structures in application data storage 106, as shown by the arrow labeled B. The data structures may generally be used to describe the application, and may also be used to describe the various published and/or unpublished versions of the application. As an example, the data structures may include such information as versioning information that describes the various versions of the application, device group information that describes the devices or device types to which the versions are targeted, and other appropriate metadata associated with the application generally or with specific versions of the application (e.g., pricing information, a textual description, screen shots, icons, an account for receiving payments from users who download the application, etc.).

After the application has been published by publisher system 104, the application may appear as an application for download via application market system 108, which may be configured to read the data structures stored in application data storage 106. According to the techniques described here, when multiple versions of an application have been published on the application market system 108, the system may determine which of the application versions is appropriate for the particular computing device that is requesting the application (or for which the application is requested in the case where the application is requested using a different computing device), and may provide that particular version of the application to the computing device. In some cases, such functionality may reduce user confusion, and may still provide software publishers the ability to publish multiple versions of an application that are targeted towards different devices or device types.

In environment 100, users may access the application market system 108 using a number of different client computing devices, e.g., devices 110, 112, and 116, as shown by the arrows labeled C. Mobile client computing devices, e.g., devices 110 and 112, such as smartphones or tablets, may communicate with the application market system 108 by way of a wireless communication channel or any other appropriate communication channel. In some implementations, the mobile computing devices may have an application market client installed as an application that executes on the device, and may be used to facilitate communication with the application market system 108. Client computing device 116 represents a desktop computing device, which may be configured to communicate with the application market system 108 over an appropriate network to access a web-based frontend for the application marketplace system 108.

When a user of a client computing device submits a request to the application market system 108, the system may read from the application data storage 106 to identify various published applications responsive to the request, and may provide for display on the client computing device information related to the responsive applications. For example, a user may submit a request to browse through various applications on the market, or may submit a search request using keywords to find applications that are associated with the entered keywords.

In response to receiving such requests, the application market system 108 may determine which version of a particular application to provide to the client computing device. In the case of an application with only a single version, the application market system 108 may use filtering techniques to only display applications that are compatible with the requesting device. In the case of an application having multiple published versions available on the application market system 108, the system may identify the particular version of the application that is targeted for the requesting device, based on one or more attributes of the device, and may provide information related to that particular version to the client computing device.

As an example, a smartphone computing device 110 may submit a request that corresponds to an application that has multiple versions published on the application market system 108. The request may include device information, such as a device identifier, that allows the application market system 108 to identify certain attributes associated with the device 110. For example, the request may include a device identifier or other device information (e.g., a framework version), which may allow the application market system 108 to determine that the smartphone has OS 2.2 installed as the framework for the device. The application market system 108 may then identify a particular version of the application that is targeted to smartphones running OS 2.2, and may provide information about that particular version of the application to the smartphone. If the user of the smartphone then decides to download the application, the particular version that was identified by the application market system 108 is provided for download to the device. If a tablet computing device 112 with OS 3.0 installed makes a similar request, the application market system 108 may respond differently, such as by identifying a different version of the application that is targeted to tablets running OS 3.0 or higher, and providing the different version for download by the tablet computing device.

In some cases, the application market system 108 may receive requests from devices that are different from the ones that will be installing and executing the application. For example, the application market system 108 may provide a web-based frontend that allows users to browse and search the application market, e.g., using a desktop computer, for the purposes of finding applications they wish to install on one or more of their mobile devices. In such cases, the device for which the application is intended may be unknown at the time the user submits the request. For example, the user may be browsing the frontend anonymously, or may be logged in, but have multiple computing devices associated with the user's account. Until the application market system 108 is able to ascertain a particular device for which the particular application is intended, the system may provide general information about the application to the user. For example, the system 108 may display summary information that is representative of all versions of the software application (e.g., pricing that is the same across all versions, screen shots that are representative of all versions, etc.). The system 108 may also indicate that specific details about the application may vary based on the version of the application that is appropriate for the intended device.

Once the application market system 108 is able to ascertain the intended device for the application, e.g., if the user indicates a particular device on which the application will be installed, the system 108 may proceed as previously described. In particular, the application market system 108 may determine one or more device attributes that are associated with the intended device, and may identify the particular version of the application that is appropriate for that device.

The application market system 108 may then provide information about the particular version to the intended device, and may facilitate the download of the particular version to the intended device. In some implementations, a logged in user may be able to initiate an install to a different device via the web-based frontend, where the appropriate version of the application is delivered to the intended device, e.g., by way of a push notification or other appropriate mechanism.

In some implementations, the application market system 108 may store various metric values associated with applications that are published on the system. For example, the application market system 108 may store installation metric values, rankings metric values, and other appropriate metric values associated with the various applications that are distributed by the system. Such metric values may be stored in application data storage 106 in association with the particular application to which the metric values apply.

In some implementations, the metric values associated with different versions of an application may be aggregated across the multiple versions. For example, if ten thousand copies of version 1.2 have been downloaded and installed on computing devices, and twenty thousand copies of version 1.4 have been installed, the installation metric value provided by application market system 108 may reflect that the total installation base of the application is thirty thousand devices. In a similar example, ranking information for a particular application may be aggregated across multiple versions of the application such that an overall ranking score, which takes into account the rankings received for each of the separate versions, may be monitored and stored.

Although application publisher system 104, application data storage 106, and application market system 108 are shown separately for purposes of illustration, it should be understood that the functionality provided by the systems shown in environment 100 may be provided by fewer devices or systems (e.g., combining multiple devices or systems into a single device or system), may be distributed amongst additional devices or system, or may be provided by different devices or systems than those shown.

Figure 1B:
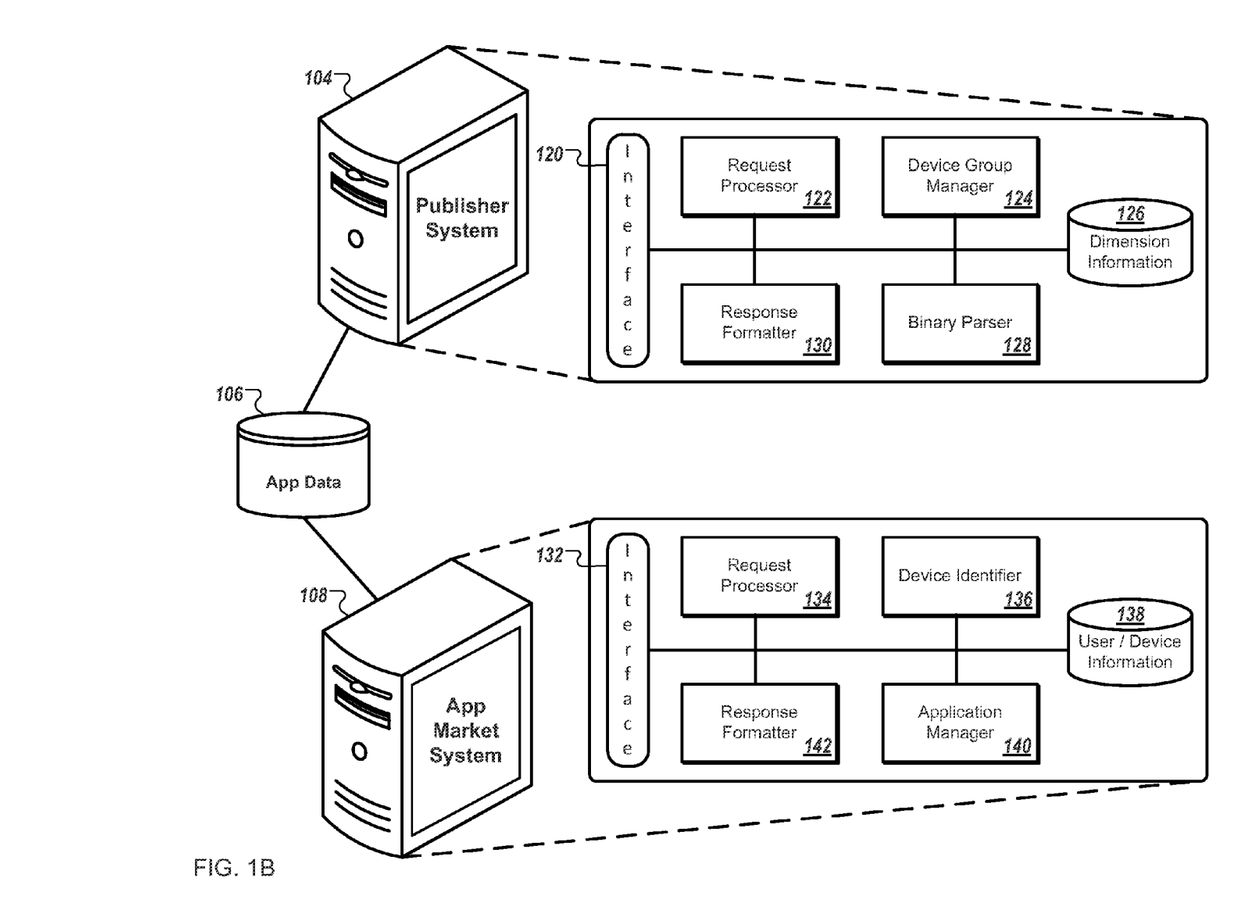
FIG. 1B is a system diagram showing examples of an application publisher system and an application market system.

FIG. 1B is a system diagram showing examples of an application publisher system 104 and an application market system 108. As shown, application publisher system 104 and application market system 108 may share a common application data storage 106 that may be used to store application information that is common to both systems.

Application publisher system 104 may include an interface 120, a request processor 122, a device group manager 124, a dimension information database 126, a binary parser 128, and a response formatter 130. Interface 120 may provide software publishers with access to the publisher system 104, and may provide appropriate user interfaces, such as those described in greater detail below in association with FIGS. 2 and 3. Requests from and responses to the software publishers may be handled by the request processor 122 and the response formatter 130, respectively.

The device group manager 124 may control the targeting of various application versions toward specific devices, device types, or groups of devices. For example, the device group manager 124 may allow software publishers to create and/or modify device groups, each of which may correspond to a different version of a particular application. The device groups may be defined using any appropriate number of dimensions, which may generally correspond to the capabilities or attributes of a device or device type. The various dimensions may be stored and/or updated in dimension information database 126.

For example, in some implementations, the publisher system 104 may allow software publishers to define device groups using three dimensions, including an installed device framework, a display screen size, and a graphics processing capability. Other and/or additional dimensions may also be used in the system, including for example, dimensions related to an OpenGL ES version, the native platform of a computing device (e.g., ARM EABI v7, INTEL, etc.), various device hardware or software features (e.g., camera, Bluetooth, Wi-Fi, telephony, etc.), the device's carrier, and/or its location.

Software publishers may choose to utilize one or more of the available dimensions when defining a particular device group using the publisher system 104. For example, in some cases, a software publisher may have different versions of an application that are all related to different device frameworks (e.g., one version for OS version 1.6 to 1.8, a second version for OS version 2.0 to 2.2, and a third version for OS version 3.0 and above). In such cases, the software publisher may define three different device groups that are only distinguished by the device framework dimension. In other cases, the software publisher may choose to further refine the device groups using additional and/or different dimensions. It should be understood that the publisher system 104 may, in various implementations, be configured to provide as many or as few dimensions as are appropriate for the particular implementation being provided.

The binary parser 128 may parse application binaries that have been uploaded by a software publisher to the system. Parser 128 may, for example, be used to separate application data from metadata that describes the application. For example, in some implementations, the binary parser 128 may be used to extract a manifest file that is embedded in the application binary. In some cases, information in the manifest file (or other appropriate information associated with the binary) may be used to automatically specify a device or type of device to which the application binary is targeted.

Application market system 108 may include an interface 132, a request processor 134, a device identifier module 136, a user and/or device information database 138, an application manager 140, and a response formatter 142. Interface 132 may, in some implementations, include multiple interfaces, such as an application interface to receive and respond to application market clients that execute on various client devices, and a web-based frontend interface to receive and respond to requests provided by a web application used to access the application market system 108. Requests from and responses to the various users of the application market system 108 may be handled by the request processor 134 and the response formatter 142, respectively.

The device identifier module 136 may be used to identify particular devices that are associated with a given request. For example, for requests that are provided through an application market client executing on a particular device, the request may include a unique device identifier or other information that is specific to an individual device. The device identifier module 136 may use the device identifier information in the request to query the user and/or device information database 138 to determine certain attributes associated with the requesting device. These attributes may then be passed to the application manager 140 for use in determining which version of a requested application should be provided to the requesting device. In some implementations, the request itself may include device attribute information that may be used to identify an appropriate version of the application for the requesting device.

For requests that are provided through the web-based frontend, the device identifier module 136 may use login information, or other user-provided information, to determine the particular device that is associated with the request. For example, if the user is logged in to the system, device identifier module 136 may query the user and/or device information database 138 to determine one or more devices that are associated with the logged in user. If the user only has one associated device, or if the user has specified a particular device with which the request is associated (e.g., by selecting a device for which a requested application is intended), the device identifier module 136 may determine the attributes associated with the user's device, which may then be provided to the application manager 140 as described above.

In some cases, requests that are provided through the web-based frontend are received from anonymous users, or from users who are logged in, but who are associated with multiple devices. In such cases, the device for which the application is intended may be unknown at the time the user submits the request. Until the application market system 108 is able to ascertain a particular device for which the particular application is intended, the system may provide general information about the application to the user. For example, the system 108 may display summary information that is representative of all versions of the software application (e.g., pricing that is the same across all versions, screen shots that are representative of all versions, etc.). The system 108 may also indicate that certain details about the application may vary based on the version of the application that is appropriate for the intended device, e.g., by displaying a "varies by device" message. After the application market system 108 is able to ascertain the intended device for the application, e.g., if the user indicates a particular device on which the application will be installed, the system 108 may proceed as previously described to determine the attributes associated with the user's device, and to provide the attributes to the application manager 140 for further processing.

Application manager 140 may be used to determine an appropriate version of a requested application to provide to a requesting device. For example, application manager 140 may compare the device attributes associated with a requesting device to the specifications of the different available application versions to determine whether any of the versions are targeted to the requesting device. If so, then the application market system 108 may provide the particular version of the application to the requesting device, such as by displaying information about the particular version in response to the request. In some cases, the response may include a mechanism, e.g., a link, that causes the application to be downloaded to the requesting device. In cases where the application manager 140 determines that none of the versions of the application are targeted to a particular requesting device, the application manager 140 may return a null result, and the application market system 108 may provide a response that the application is not available for the requesting device.

If the various application versions are associated with respective device groups, e.g., using the publisher system 104, the application manager 140 may match the device attributes to a particular device group, and may provide the application version that is associated with the particular device group to the requesting device. For example, if the requesting device attributes include OS 2.0 and a large screen size, application manager 140 may identify a device group that matches those attributes, and provide the application version associated with that device group to the device. In some implementations, multiple device groups may be configured to match the attributes of a requesting device (e.g., there may be some overlap in the definitions of the device groups). In such instances, the application manager 140 may utilize a predefined tie-breaking rule to determine which of the application versions to provide to the requesting device. For example, the application manager 140 may provide the application version with the highest version code, from among the device groups that match the device attributes, to the requesting device. In other implementations, additional or alternative tie-breaking rules may be applied in such situations (e.g., the most recently updated application version may be provided to the requesting device, or an application version associated with a preferred device group may be provided, or the most specific or most restricted application version may be provided).

In some implementations, the application manager 140 may determine an appropriate version of a requested application to provide to a requesting device using a predetermined procedure. The predetermined procedure may first order the device groups in reverse order of the published application version codes. Then, the device attributes may be matched against each of the corresponding device group attributes until a matching device group is identified. In some cases, the application version associated with the device group may further be evaluated to determine whether the application version is compatible for use on the device (e.g., in cases where the application has restrictions other than those used for defining the dimensions of the device group). If an appropriate application version is identified for the device, then it is provided to the requesting device. Otherwise, the system may respond that the application is not available for the requesting device.

Figure 2:
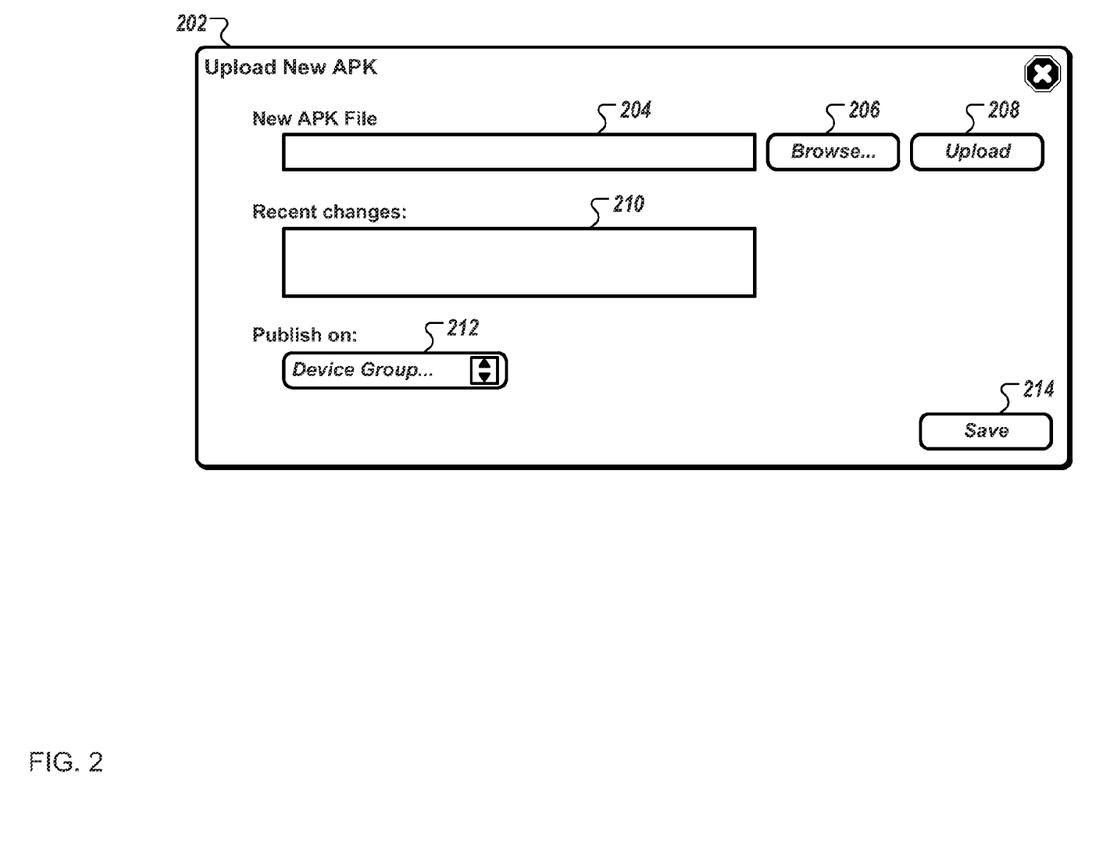
FIG. 2 is a diagram of an example user interface that allows software publishers to upload multiple versions of a software application.

FIG. 2 is a diagram of an example user interface 202 that allows software publishers to upload multiple versions of a software application. User interface 202 may provide a number of different controls and inputs to allow a software publisher to associate the application versions that are uploaded with a particular device group. Although user interface 202 is shown as including a specific configuration of text boxes 204, 210, buttons 206, 208, and 214, and a drop-down box 212, it should be understood that other configurations and/or input mechanisms may also be provided.

In the example user interface 202, a software publisher may specify the path of an application binary in text box 204. The application binary may correspond to one of the versions of the software application. As illustrated, user interface 202 may also include a browse button 206 that allows the software publisher to browse the file system of the local computing device, or of other accessible computing devices. After the path to the application binary has been entered, the software publisher may click the upload button 208 to upload the binary to the publisher system.

User interface 202 may also include a text box 210 that allows the software publisher to describe recent changes that have been made to the application version. For example, in cases where the application version that is to be uploaded is an update to a previous application version, the software publisher may enter text in the form of release notes that may be presented to users when they are presented with the update. Such information may be helpful to the user in deciding whether or not to install the update on his or her computing device, and to potentially alert the user to new features that may have been added to the application since the last update.

User interface 202 may also include a drop-down box 212, or another appropriate control, that allows the software publisher to publish the application binary on a particular device group. As described above, a particular device group may correspond to a group of devices or types of devices to which the application version is being targeted. For example, one device group may be associated with smartphones, while another device group may be associated with tablets, and yet another device group may be associated with set-top computing devices. As another example, a device group may target smartphones with a small or normal screen size, while another device group may target smartphones with a large or extra-large screen size. The use of device groups as described here may allow software developers to create different versions of their applications that are optimized for or otherwise tailored to a particular device or group of devices, and may provide software publishers with increased control over how the various versions are distributed to particular devices. In some implementations, the drop-down box 212 may provide a suggested device group that has been preselected from the defined device groups, e.g., based on information that has been parsed from a manifest file associated with the application binary. In these cases, the software publisher may accept the suggested device group for the application version, or may be allowed to choose a different device group available in the drop-down box. Once the software publisher has finished inputting the information about the application version being uploaded, the publisher may click a save button 214 to complete the upload process.

In some implementations, the software publisher may be allowed to complete the upload process, e.g., by clicking the save button 214, without choosing a particular device group. For example, the software publisher may upload one or more versions that are not intended for publication at the time of the upload, and therefore, the software publisher may choose not to select a device group to associate with the application version. In some implementations, only the application versions that have been associated with one or more particular device groups are published for access by users on the application market system.

Figure 3:
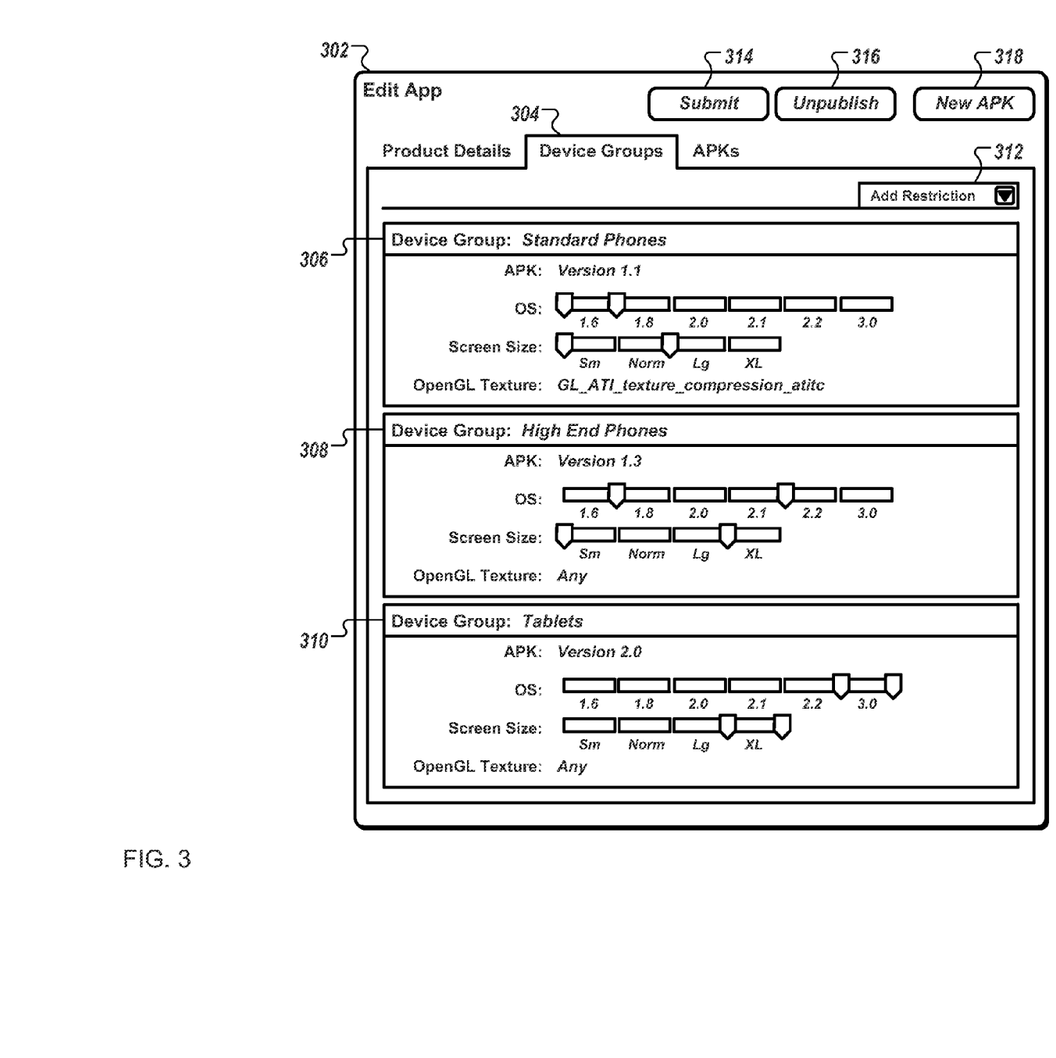
FIG. 3 is a diagram of an example user interface that allows software publishers to describe and modify device groups to which different versions of a software application are targeted.

FIG. 3 is a diagram of an example user interface 302 that allows software publishers to describe and modify device groups to which different versions of a software application are targeted. User interface 302, like user interface 202, may provide a number of different controls and inputs to allow a software publisher to specify how different versions of a software application are handled. Although user interface 302 is shown as including a specific configuration of tabs 304, buttons 314, 316, and 318, sliders, and a drop-down box 312, it should be understood that other configurations and/or input mechanisms may also be provided. In general, user interface 302 may provide software publishers with control over how versions of their applications are targeted to particular device groups, and may provide a visualization of which devices will receive a particular application version.

User interface 302 may present a tabbed interface, which as illustrated, includes a Product Details tab, a Device Groups tab 304, and an APKs tab. In this particular example, the Device Groups tab 304 is active. In general, the Product Details tab may allow software publishers to specify various information about the application in general, such as a description of the application, screen shots of the application, and the like. Such information may be applicable to all of the different versions of the application. The Device Groups tab 304, as described in greater detail below, may allow software publishers to create and/or modify the device groups that may be used to associate specific application versions with particular devices or device types for which the particular application version is targeted. The APKs tab may allow software publishers to manage the binaries that have already been uploaded for a particular application, or to upload additional binaries associated with the application. It should be understood that, although this document discusses application binaries in the form of APK files, other types of application binaries may also be processed according to the techniques described here.

The Device Groups tab 304 may include multiple device groups 306, 308, and 310, each of which may be used to describe the targeted devices for a particular version of the software application being published. In the example, application version 1.1 is associated with device group 306, which is labeled "Standard Phones." Device group 306 is targeted to devices with OS 1.6, a small or normal screen size, and the "GL_ATI_texture_compression_atitc" OpenGL texture compression format. Application version 1.3 is associated with device group 308, which is labeled "High End Phones," and is targeted to devices with OS 1.8 through 2.1 and small through large screen sizes. In this example, device group 308 is compatible with any OpenGL texture compression format. Device group 310 is labeled "Tablets," and is targeted to devices with OS 3.0 having an extra-large screen size. These and other device group configurations may be managed by the publisher of the application via user interface 302.

The device groups may include any appropriate number of device attributes or dimensions that may be used to target specific versions of an application for specific devices. For example, the device groups may allow software publishers to specify a particular operating system or other operational framework associated with the device, and/or a particular screen size associated with the device, and/or particular graphics capabilities associated with the device, e.g., OpenGL texture compression formats that are compatible with the device. Other attributes or dimensions that may be used in accordance with the techniques described here may include, for example, an OpenGL ES version, a native device platform (e.g., ARM EABI v7, INTEL, etc.), or certain device features or device capabilities (e.g., camera, Bluetooth, telephony, GPS, motion sensors, etc.). In some implementations, additional dimensions such as the device's carrier and/or location may also be used in accordance with the techniques described here.

These and other appropriate attributes or dimensions may be further segmented (e.g., by specifying a front-facing versus a rear-facing camera) in an appropriate manner to allow for as much or as little device granularity as may be appropriate for a particular implementation. In general, additional granularity may provide software publishers with greater control over how the different versions of an application are distributed, while less granularity may provide for a less complicated interface for software publishers. In some implementations, the system may allow the software publishers to define the level of granularity that they wish to utilize in targeting their application versions to specific device groups.

The device group attributes may be described in terms of a specific value, a set of specific values, or a range of values. For example, as shown in user interface 302, the OpenGL texture compression format for device group 306 is defined using the specific value "GL_ATI_texture_compression_atitc." In other words, if a device utilizes any other OpenGL texture compression format than the value specified, the device does not fit within the device group. As another example shown in user interface 302, the OS versions that are targeted by device group 308 includes a range from OS 1.8 up to OS 2.1. When a device group attribute is described using a range of values, a device having a device attribute that falls anywhere within the range may be considered to fit within the device group. Similarly, when a device group attribute is described using a set of specific values, a device that has a device attribute that matches any of the specific values may be considered to match the particular device group attribute.

In some implementations, the publisher system may allow device groups to describe overlapping device group attributes. For example, as shown in user interface 302, small and normal screen sizes are specified in device groups 306 and 308, and device group 308 additionally specifies large screen sizes. In such cases where overlapping device group attributes are permitted, the system may utilize appropriate rules to determine which application versions should be provided to a user. Continuing with the example above, one approach may be to provide the application version with the highest version code to the user. In some implementations, such an overlap may cause the system to provide a warning to the software publisher to ensure that he or she is aware of the overlap before confirming the device group configuration.

User interface 302 may be programmed to identify errors when a software publisher chooses device group settings that are not permitted by the system. For example, in some implementations, a software publisher may define two device groups such that one of the two is completely subsumed by the other, and where the application version associated with one of the device groups would never be provided to users. If this functionality is impermissible under the publication rules provided by the system, then the system may generate an error. Such errors may be raised to the software publisher using familiar techniques, such as by displaying a visible error message that describes the error, by playing an audible alert, or the like. In some implementations, if an error is raised during publication, the software publisher may not be allowed to continue with the publication process before fixing the cause of the error.

User interface 302 may also be programmed to identify warnings when a software publisher chooses device group settings that, while they may not rise to the level of being impermissible, may create some ambiguity regarding how the application versions are to be handled. For example, in some implementations, a warning may be generated when two application versions partially overlap in one or more dimensions. In such cases, the system may provide a default set of rules that handle the overlapping dimensions according to a predefined procedure, e.g., by providing the version with the higher version code to the device. As another example, a warning may be generated when a software publisher changes a device group such that devices that were previously provided access to a version of the application are no longer associated with any versions of the application. In such an example, a user may not be provided with any updates to the application since none of the device groups are targeted to the user's device.

The functionality described above with respect to user interface 302 may also be accomplished automatically by the publisher system, without any intervention from the software publisher. In such implementations, the definitions that are used to describe the various device groups may be generated using information associated with the application version itself. In some cases, a binary that corresponds to a particular application version may include embedded information, such as in an application manifest, that is used to describe particular device attributes that are compatible with the application version. For example, an application manifest may declare that the binary is only compatible with OS 2.0 or above. In this example, the publisher system may automatically create a device group that corresponds to the compatibility of the binary, namely by creating a device group that targets devices having OS 2.0 or above.

In some implementations, a combination of the user interface 302 and automatic application version targeting may be utilized. For example, as an initial approach, the publisher system may utilize information in the binary to create a device group for the application version. Then, a software publisher may be able to adjust the device group by way of user interface 302, e.g., by expanding or contracting the range of one or more particular device group attributes. For example, continuing with the example above, the software publisher may decide that, although the application version is compatible with OS 2.0 and above, a different application version may be better targeted to OS 2.2 and above, and the publisher may therefore decide to tweak the device group for the present application version to devices having OS 2.0 or OS 2.1, thus contracting the original target group of devices.

In general, the example user interface 302 as described above may be used to create and/or modify device groups that are used to target an application version to a particular device or group of devices. However, it should be understood that other user interfaces may be used to achieve similar functionality consistent with systems and techniques described here.

Figure 4:
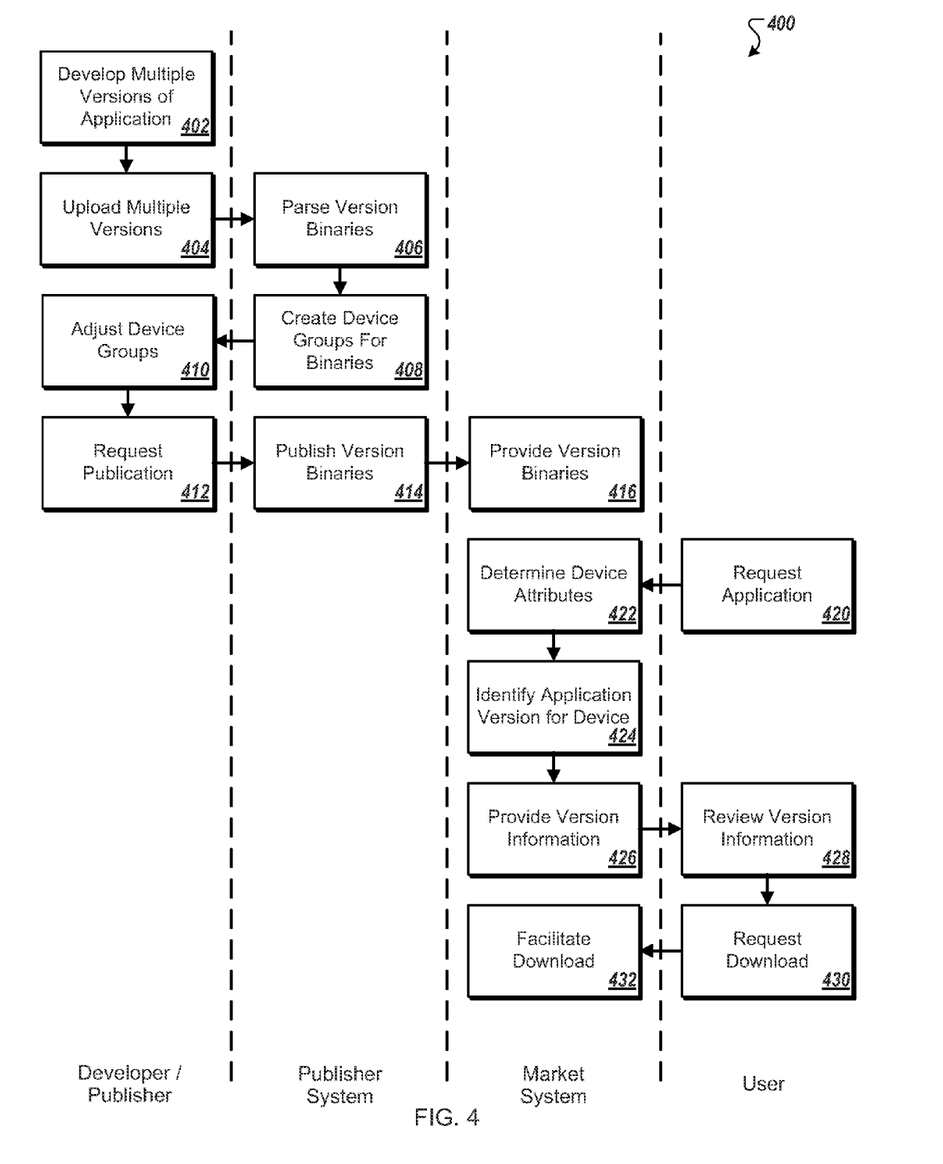
FIG. 4 is a swim-lane diagram of an example process for publishing and distributing software applications that have multiple versions.

FIG. 4 is a swim-lane diagram of an example process 400 for publishing and distributing software applications that have multiple versions. Process 400 may be implemented, for example, by the publisher system 104 and application market system 108 of FIGS. 1A and 1B. For clarity of presentation, the description that follows uses these systems as the basis for describing process 400. However, other systems, or combination of systems, may also or alternatively be used to perform the process.

Process 400 begins when a software developer writes a software application for publication on an application market system. In particular, according to the techniques described here, the software developer develops multiple different versions of the application for publication on the application market system (402). For purposes of simplicity, the software developer is described as being the same entity as the software publisher in process 400, but in some cases, a different entity may be responsible for publishing software applications that another entity has developed.

The software publisher may then upload the various versions to the publisher system (404). The software publisher may upload all of the different versions of the application at the same time, or may choose to upload the different versions over time. Regardless of when the versions are uploaded, the publisher system may parse the binaries that correspond to each of the application versions as they are uploaded to the system (406). Such parsing may allow the publisher system to extract certain metadata related to the application version, which may then be used to create a device group for each respective binary (408).

For example, the binaries may include a manifest file that describes certain operational requirements for the application to be compatible with a particular device. If the binary is not configured to operate on devices with small screens, for example, the manifest file may specify that the application version is only compatible with devices having normal or larger sized screens. This classification may then be applied to a device group that is used to target the application version to a particular device or group of devices.

In some implementations, the publisher of the application may be allowed to adjust the device groups (410). For example, if the application version will work on devices having normal or larger sized screens, the classification may initially include all devices with normal or larger sized screens. However, the publisher may also have a different version of the application that is specifically targeted to devices with extra-large screens, and may therefore want the present version of the application to only be released to devices with normal or large sized screens, and for the different version to be release to devices with extra-large screens. In such a scenario, the publisher may choose to adjust the device groups accordingly.

After the publisher has adjusted the device groups for the various application versions to target the appropriate intended devices, the publisher may request publication of the binaries (412). In turn, the publisher system may publish the version binaries on the application market system (414), e.g., by updating a database used by the application market system, and the application market system may provide the appropriate version binaries (416) to users accessing the market according to the techniques described here.

The user access portion of process 400 begins when a user requests a particular application from the application market (420). The request may be made through any appropriate interface. For example, the user's device may include a client marketplace application that communicates with the application market system to provide access to the applications provided by the market system. As another example, the user may access a web-based frontend to the application market system to request an application. Requests for applications may be provided in different forms. For example, a user may be able to browse through the various applications hosted by the application market, or may search for applications using conventional searching tools.

In response to receiving a request, the application market system may determine one or more device attributes associated with the user's computing device (422). For example, if the user accesses the application market from a computing device by way of a client marketplace application executing on the computing device, the request may include device information (e.g., a device identifier) that allows the application market system to determine various device attributes associated with the device. In some implementations, the application market system may determine the device attributes based on the device identifier included with the request (e.g., by looking up attributes of a registered device using the device identifier sent with the request). In other implementations, the request itself may include certain device attributes that may be utilized by the application market system as described below.

The application market system may then identify a particular version of the software application, from among the multiple versions that had previously been uploaded by the software publisher as described above, that is targeted for the user's device (424). For example, the application market system may use the device attributes that were determined to identify a particular application version that is targeted to devices having those device attributes. After identifying the appropriate application version for the device, the application market system may provide information about the application version to the user (426). For example, the application market system may provide certain information related to the specific version of the application, e.g., for display to the user. The information may include, for example, file size, pricing, and other information related to the application generally, or to the specific version of the application that is targeted to the user's device. In addition, the information may include a mechanism (e.g., a button or a link) that allows the user to download the identified application version.

The user may then review the version information (428), and may request to download the application version (430), e.g., using the mechanism that is provided by the application market system. Upon receiving the request for download, the application market system may facilitate the download (432), e.g., by collecting payment information for a paid application, and authorizing the download for the user.

Figure 5:
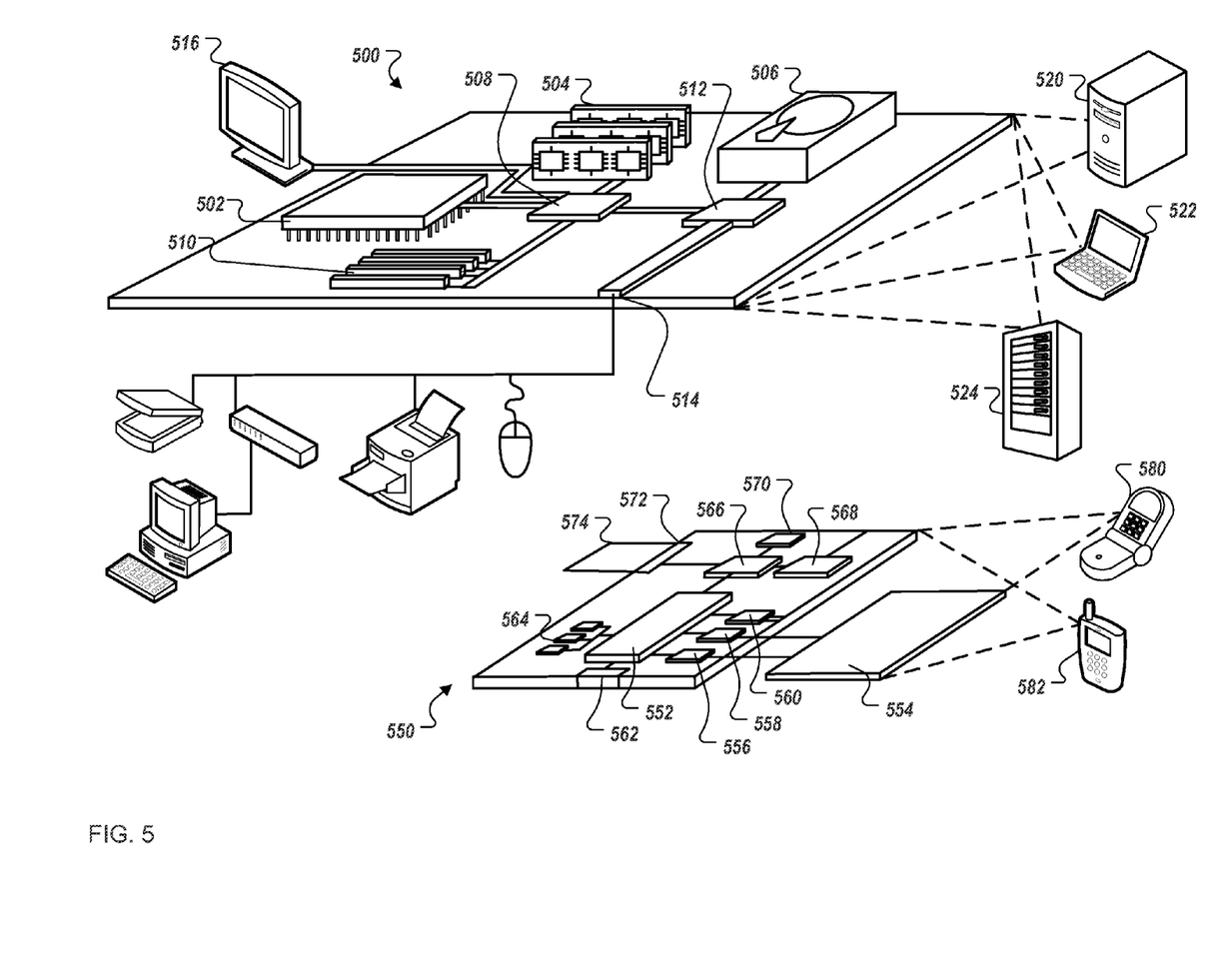
FIG. 5 shows an example of a computer device and a mobile computer device that can be used to implement the techniques described here.

FIG. 5 shows an example of a computing device 500 and a mobile computing device 550 that can be used to implement the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple busses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various busses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures may not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    receiving, at a computer system, a first version of a software program;
    associating, with the computer system, the first version of the software program with a first type of computing device;
    providing a plurality of versions of the software program including the first version, wherein the plurality of versions of the software program are simultaneously available and each version is associated with a different type of computing device;
    receiving, at the computer system and from a user of the software program, information that defines capabilities of a computing device of the user;
    determining, from by analyzing the information that defines capabilities of the computing device of the user, a particular type of the computing device of the user;
    based on the determining, selecting a version of the software program associated with the particular type of computing device; and
    providing the selected version of the software program to the computing device of the user.

2. The method of claim 1, wherein the information that defines capabilities of the computing device of the user includes at least two from a group consisting of an installed device framework, a display screen size, and a graphics processing capability.

3. The method of claim 1, further comprising collecting rankings information associated with the software program across the plurality of versions of the software program such that a ranking metric value associated with the software program reflects rankings from users of different versions of the software program.

4. The method of claim 1, wherein, after receiving the first version of the software program, the computer system receives other versions of the software program.

5. The method of claim 1, wherein providing the selected version of the software program to the computing device of the user comprises transmitting the selected version of the software program to the computing device of the user.

6. The method of claim 1, wherein only the selected version is made available to the computing device of the user.

7. A computer-implemented method for distributing software through an application marketplace, the method comprising:
    receiving, at a computer system, a plurality of versions of a software program, each of the plurality of versions of the software program being provided to operate on a particular type of computing device;
    providing the plurality of versions of the software program, wherein the plurality of versions of the software program are simultaneously available;
    receiving, at the computer system and from a user of the software program, information that defines capabilities of a device of the user;
    selecting, from among the plurality of versions of the software program, a particular version of the software program, wherein selecting comprises analyzing the information that defines the capabilities of the device of the user and determining that the particular version is associated with the capabilities of the device of the user; and
    providing the selected version of the software program to the device of the user.

8. The method of claim 7, wherein the information that defines capabilities of the computing device of the user includes at least two from a group consisting of an installed device framework, a display screen size, and a graphics processing capability.

9. The method of claim 7, further comprising collecting rankings information associated with the software program across the plurality of versions of the software program such that a ranking metric value associated with the software program reflects rankings from users of different versions of the software program.

10. The method of claim 7, wherein a software developer who created the plurality of versions of the software program associates each of the plurality of versions of the software program with a corresponding particular type of computing device.

11. The method of claim 7, wherein the computer system associates each of the plurality of versions of the software program with a corresponding particular type of computing device.

12. The method of claim 7, further comprising providing, by the computer system, a user interface the allows software publishers to define types of computing devices using various device attributes.

13. The method of claim 7, wherein only the selected version is made available to the computing device of the user.

14. The method of claim 7, further comprising receiving, at the computer system, information relating to the plurality of versions of the software program that describe dependencies and restrictions that relate to types of computing devices that are capable of executing the software program.

15. The method of claim 14, wherein the computer system associates each of the plurality of versions of the software program with a corresponding particular type of computing device based on the received information relating to the plurality of versions of the software program.

16. The method of claim 14, wherein the information relating to the plurality of versions of the software program comprises information relating to operating system compatibility.

17. The method of claim 14, further comprising writing, by the computer system, one or more data structures storing the information relating to the plurality of versions of the software program.

18. A non-transitory computer accessible medium storing instructions that, when executed by a processor, perform operations comprising:
 receiving a plurality of versions of a software program, each of the plurality of versions of the software program being provided to operate on a particular type of computing device;
 providing the plurality of versions of the software program, wherein the plurality of versions of the software program are simultaneously available;
 receiving information that defines capabilities of a device of a user;
 selecting, from among the plurality of versions of the software program, a particular version of the software program, wherein selecting comprises analyzing the information that defines the capabilities of the device of the user and determining that the particular version is associated with the capabilities of the device of the user; and
 providing the selected version of the software program to the device of the user.

19. The non-transitory computer accessible medium of claim 18, wherein the information that defines capabilities of the computing device of the user includes at least two from a group consisting of an installed device framework, a display screen size, and a graphics processing capability.

20. The non-transitory computer accessible medium of claim 18 wherein a software developer who created the plurality of versions of the software program associates each of the plurality of versions of the software program with a corresponding particular type of a computing device.

\* \* \* \* \*